(12) United States Patent
Suto et al.

(10) Patent No.: US 11,997,737 B2
(45) Date of Patent: May 28, 2024

(54) COGNITIVE HOTSPOT PROVISIONING AND NETWORK PRIORITIZATION

(71) Applicant: Kyndryl, Inc., New York, NY (US)

(72) Inventors: Tiberiu Suto, Franklin, NY (US);
Shikhar Kwatra, San Jose, CA (US);
Hemant Kumar Sivaswamy, Pune (IN); Nadiya Kochura, Bolton, MA (US)

(73) Assignee: KYNDRYL, INC., New York, NY (US)

( * ) Notice: Subject to any disclaimer, the term of this patent is extended or adjusted under 35 U.S.C. 154(b) by 326 days.

(21) Appl. No.: 17/588,532

(22) Filed: Jan. 31, 2022

(65) Prior Publication Data
US 2023/0300930 A1    Sep. 21, 2023

(51) Int. Cl.
*H04W 4/00* (2018.01)
*H04W 12/08* (2021.01)
*H04W 76/14* (2018.01)
*H04W 76/18* (2018.01)

(52) U.S. Cl.
CPC .......... *H04W 76/18* (2018.02); *H04W 12/08* (2013.01); *H04W 76/14* (2018.02)

(58) Field of Classification Search
CPC ...... H04W 76/18; H04W 12/08; H04W 76/14
USPC ........................................................ 370/329
See application file for complete search history.

(56) References Cited

U.S. PATENT DOCUMENTS

| | | | |
|---|---|---|---|
| 8,804,517 B2 | 8/2014 | Derton | |
| 9,838,840 B1 | 12/2017 | Lee | |
| 9,986,087 B2 | 5/2018 | Li | |
| 10,028,186 B1 | 7/2018 | Marupaduga | |
| 10,499,286 B2 | 12/2019 | Obaidi et al. | |
| 10,531,360 B1 | 1/2020 | Govindassamy | |

(Continued)

FOREIGN PATENT DOCUMENTS

| | | |
|---|---|---|
| CN | 103117906 | 5/2013 |
| CN | 104618905 | 5/2015 |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Marceau Milord
(74) *Attorney, Agent, or Firm* — Erik Swanson; Andrew M. Calderon; Calderon Safran & Cole P.C.

(57) ABSTRACT

A computer implemented method and system are disclosed for dynamically enabling a first user device operated by a first user to provide wireless hotspot capability for a wireless hotspot session to a second user device operated by a second user. The wireless hotspot session is accepted based at least on urgency and bandwidth requirement of the second user device. When the first user device accepts a connection to the second user device to provision a wireless hotspot for the wireless hotspot session, the first user restricts use of the second user device in the wireless hotspot session, based on bandwidth and context of use of the second user device. The first user device may refuse a connection by rejecting the wireless hotspot session request. wireless hotspot session transactions information is provided as blockchain ledgers.

20 Claims, 11 Drawing Sheets

(56) References Cited

U.S. PATENT DOCUMENTS

| | | | |
|---|---|---|---|
| 10,575,244 B1* | 2/2020 | Gustafson | H04W 64/00 |
| 10,638,320 B2* | 4/2020 | Wang | H04L 63/083 |
| 10,826,945 B1* | 11/2020 | Xu | H04L 9/0825 |
| 11,245,727 B2* | 2/2022 | Singh | G06F 21/6236 |
| 11,270,250 B2* | 3/2022 | Lin | G06Q 30/0633 |
| 2013/0304631 A1 | 11/2013 | Wang | |
| 2015/0055504 A1 | 2/2015 | Bellamkonda et al. | |
| 2015/0269150 A1* | 9/2015 | Carper | G06Q 30/0261 707/724 |
| 2017/0094054 A1 | 3/2017 | Li | |
| 2019/0147548 A1* | 5/2019 | Klein | G06Q 30/0202 705/7.19 |
| 2019/0281457 A1* | 9/2019 | Wang | H04L 63/083 |
| 2020/0092797 A1 | 3/2020 | Gustafson et al. | |
| 2020/0204467 A1 | 6/2020 | Yu | |
| 2020/0214081 A1* | 7/2020 | Spanton | H04L 9/50 |
| 2020/0275336 A1* | 8/2020 | Rocci | H04W 72/53 |
| 2020/0367143 A1 | 11/2020 | Xiao et al. | |
| 2021/0058383 A1* | 2/2021 | Colon | H04W 12/73 |
| 2021/0068203 A1* | 3/2021 | Katrib | H04N 21/436 |
| 2021/0166069 A1* | 6/2021 | Jorge | G06Q 40/12 |
| 2021/0167978 A1* | 6/2021 | Jorge | H04M 15/8033 |
| 2021/0211902 A1 | 7/2021 | Achyuth et al. | |
| 2021/0329542 A1* | 10/2021 | Singh | H04W 48/16 |
| 2022/0141025 A1* | 5/2022 | Bogineni | H04L 9/3236 713/156 |
| 2022/0335302 A1* | 10/2022 | Banipal | G06N 3/088 |
| 2022/0353801 A1* | 11/2022 | Misra | H04W 24/10 |
| 2023/0221403 A1* | 7/2023 | Meadow | H04L 9/3239 701/517 |

FOREIGN PATENT DOCUMENTS

| | | |
|---|---|---|
| CN | 105472550 | 4/2016 |
| CN | 107371277 | 11/2017 |

OTHER PUBLICATIONS

Ballantyne et al.; "Autoconfiguration For Faster WiFi Community Networks", INM IFIP/IEEE International Symposium, May 11-15, 2015, 4 pages.

Kim et al.; "Optimal Admission And Conviction Control of Secondary Users at Cognitive Radio Hotspots", SAHCN IEEE 6th Annual Conference, Jun. 22-26, 2009, 9 pages.

Seufert et al.; "HORST—Home Router Sharing Based on Trust", CNSM IEEE 9th International Conference, Oct. 14-18, 2013, 4 pages.

Cao et al.; "Social Wi-Fi: Hotspot Sharing With Online Friends", PIMRC IEEE 26th Annual International Conference, Aug. 30-Sep. 2, 2015, 6 pages.

El Alami et al.; "A Framework For Hotspot Support Using Wi-Fi Direct based Device-To-Device Links", IWCMC IEEE 13th International Conference, Jun. 26-30, 2017, 7 pages.

Megan Geuss, "New York Public Library will rent Wi-Fi hotspots to people who need it most" https://arstechnica.com/information-technology/2014/12/new-york-public-library-will-rent-wi-fi-hotspots-to-people-who-need-it-most/, Dec. 2, 2014, 6 pages.

Unknown, "Wi-Fi Hotspots", https://www.torontopubliclibrary.ca/using-the-library/computer-services/wifi-hotspots/, downloaded Jan. 27, 2022, 2 pages.

* cited by examiner

COGNITIVE HOTSPOT PROVISIONING AND NETWORK PRIORITIZATION

BACKGROUND

Aspects of the present invention relate generally to peer sharing of Wi-Fi hotspots and, more particularly, to selective utilization of network bandwidth based on selection of applications in use and urgency of a secondary user, in accordance with the rules configured by a primary user providing the service.

Wi-Fi and broadband data plans are commonplace among users of mobile devices (i.e., mobile phones, tablets, laptops, etc.). Some mobile devices have access to broadband networks, such as satellite and cellular networks. Some mobile devices can connect to the Internet only via a Wi-Fi connection, such as through an 802.11 protocol transceiver, without broadband access. Many cellular carriers allow a user to use their mobile phone as mobile hotspot. As a mobile hotspot, a user is connected to broadband service via their cellular transceiver in the mobile phone, and then allow another device to access the broadband network by connecting to the phone's Wi-Fi transceiver. This type of sharing requires the second device to be logged in with the phone's mobile hotspot password.

SUMMARY

In a first aspect of the invention, there is a computer-implemented method including: receiving by a first user device operated by a first user, a request for a wireless hotspot session by a second user device operated by a second user, the request including a level of urgency and bandwidth requirement of the second user device; determining by the first user device whether to authorize the requested wireless hotspot session based in part on the level of urgency and the bandwidth requirement of the second user device; responsive to authorization by the first user device, connecting by the first user device, the second user device to the first user device's wireless hotspot for the wireless hotspot session, and restricting use of the second user device in the wireless hotspot session, based on the bandwidth requirement of the second user device and context of use of the second user device; responsive to rejection by the first user device, the first user device refusing a connection to the second user device by the first user device for the wireless hotspot session; and providing by the first user device, transaction information corresponding to the wireless hotspot session as a blockchain ledger.

In another aspect of the invention, there is a computer program product including one or more computer readable storage media having program instructions collectively stored on the one or more computer readable storage media. The program instructions are executable to: identify a criticality level for bandwidth required by a second user of a second user device; identify by the second user device, at least one device having hotspot bandwidth in proximity to the second use device; assign a trust score to each of the at least one device based on a known transaction history of each of the at least one device or transaction history broadcast by the at least one device; compute a reachability score for each of the at least one device; select a first user device from the at least one user device based in part by the trust score and reachability score corresponding to the first device; and send a request for a wireless hotspot session to the first user device, the request including the and identification of the second user device and the identified criticality level for bandwidth required by the second user device. In response to the first user device accepting the wireless hotspot session and connecting to the second user device, the second user device provides a transaction blockchain ledger for the wireless hotspot session.

In another aspect of the invention, there is system including a processor, a computer readable memory, one or more computer readable storage media, and program instructions collectively stored on the one or more computer readable storage media. The program instructions are executable to dynamically enable a first user device operated by a first user to provide Wi-Fi hotspot capability for a wireless hotspot session to a second user device operated by a second user, based at least on urgency and bandwidth requirement of the second user device; responsive to authorization by the first user device, connect the second user device to the first user device's Wi-Fi hotspot for the wireless hotspot session, and restrict use of the second user device in the wireless hotspot session, based on bandwidth and context of use of the second user device; responsive to rejection by the first user device, refuse a connection to the second user device by the first user device for the wireless hotspot session; and provide transaction information corresponding to the wireless hotspot session as a blockchain ledger.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
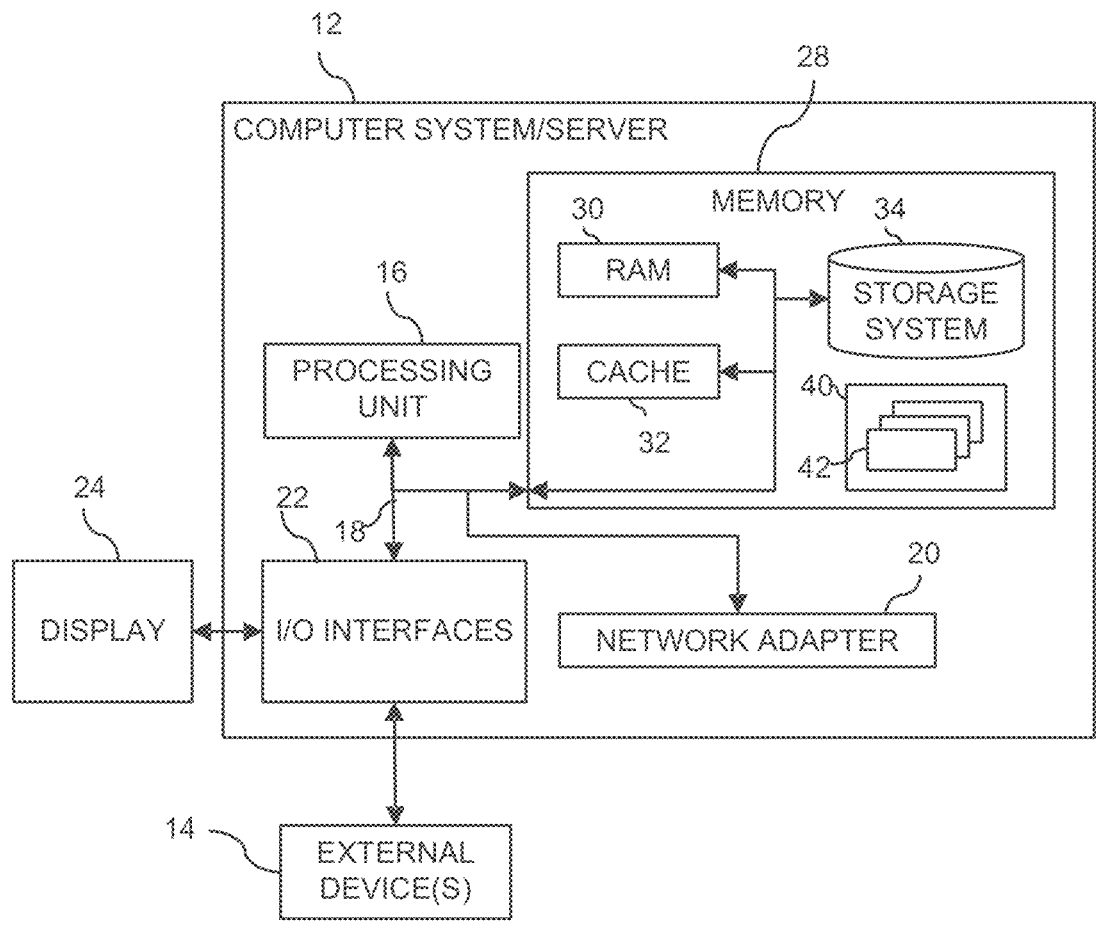
FIG. 1 depicts a cloud computing node according to an embodiment of the present invention.

Aspects of the present invention relate generally to peer sharing of wireless hotspots and, more particularly, to selective utilization of network bandwidth based on selection of applications in use and urgency of a secondary user, in accordance with the rules configured by a primary user providing the service. According to aspects of the invention a primary user allows a secondary user to use broadband connectivity via a selective Wi-Fi connection. In embodiments, secondary users are allowed access to the primary user's broadband connection based on several contextual and historical factors. For instance, in some embodiments, the secondary user's historical use of the sharing network, the type of application they need to use, and the urgency of their need to connect to the Internet may be weighed by the primary user to determine whether to grant the secondary user access to their bandwidth. In an embodiment, some friends and family of the primary user may be granted automatic access, or priority access. In this manner, implementations of the invention may allow users of the sharing network to borrow a broadband connection from another without requiring the necessity of face-to-face interaction explaining to the donor why the loan is necessary and asking for a password. This sharing system acts on a case-by-case basis based on necessity and the primary user's available network bandwidth. Previous methods of giving out your password, even if thought to be temporary, can allow the secondary user to connect to the primary user's network connection whenever their mobile hotspot is turned on, because mobile hotspot and Wi-Fi passwords are often changed infrequently and stored in the device once connected. Embodiments may use blockchain protocols to ensure that both bandwidth donors and borrowers are trustworthy based on their past activities/transactions. In some embodiments, incentives may be provided to donors to encourage them to continue offering unused bandwidth.

One embodiment is a computer-implemented method comprising: dynamically enabling a first user device to provide wireless hotspot capability to a second user device based on urgency, e.g., need for the second user device to access the wireless network, and bandwidth requirement; connecting the second user device to the first user device's mobile hotspot; restricting use of the second user device connected to the mobile hotspot of the first user based on bandwidth and context of use of the second user device to avoid misuse of the first user device's mobile hotspot. An embodiment includes creating a list of trusted network devices for at least the second user device to connect to. An embodiment includes enabling a first user device to "donate" access to a second user device for a specific context. An embodiment includes assigning a higher priority for a user device of a plurality of user devices based on need. An embodiment includes leveraging a blockchain network to keep track of transactions comprising connection to devices and devices providing wireless hotspot capabilities.

Implementations of various embodiments provide an improvement in the technical field of mobile Wi-Fi and wireless hotspots. In particular, implementations automatically identify trusted donors and benefactors of mobile network bandwidth and provide either automatic connection or managed connection based in part on urgency, needed resources and context of the borrower requests. Implementations utilize a blockchain network to store historic signed transaction ledgers for use by the donors and borrowers. The donor's system retrieves historical transaction data from the blockchain network after receiving a borrow request. The system either presents the donor with a connection recommendation, or automatically rejects or accepts the request based on the context and historical data. In an embodiment, the user may override the recommendation to approve or reject the connection, and manually set constraint restrictions for the session. Connection request transaction data is stored in the blockchain in open signed ledgers for later use. This improves network access to borrowers who might not have access to a network connection otherwise. Use of the blockchain helps ensure that only trusted users have access to the system. In particular, implementations are usable to modify the blockchain ledgers and enable communication of a borrower to the Internet or other communication network via a borrowed pass-through network connection provided by a donor.

It should be understood that, to the extent implementations of the invention collect, store, or employ personal information provided by, or obtained from, individuals (for example, usernames, location, device identifications, applications used, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
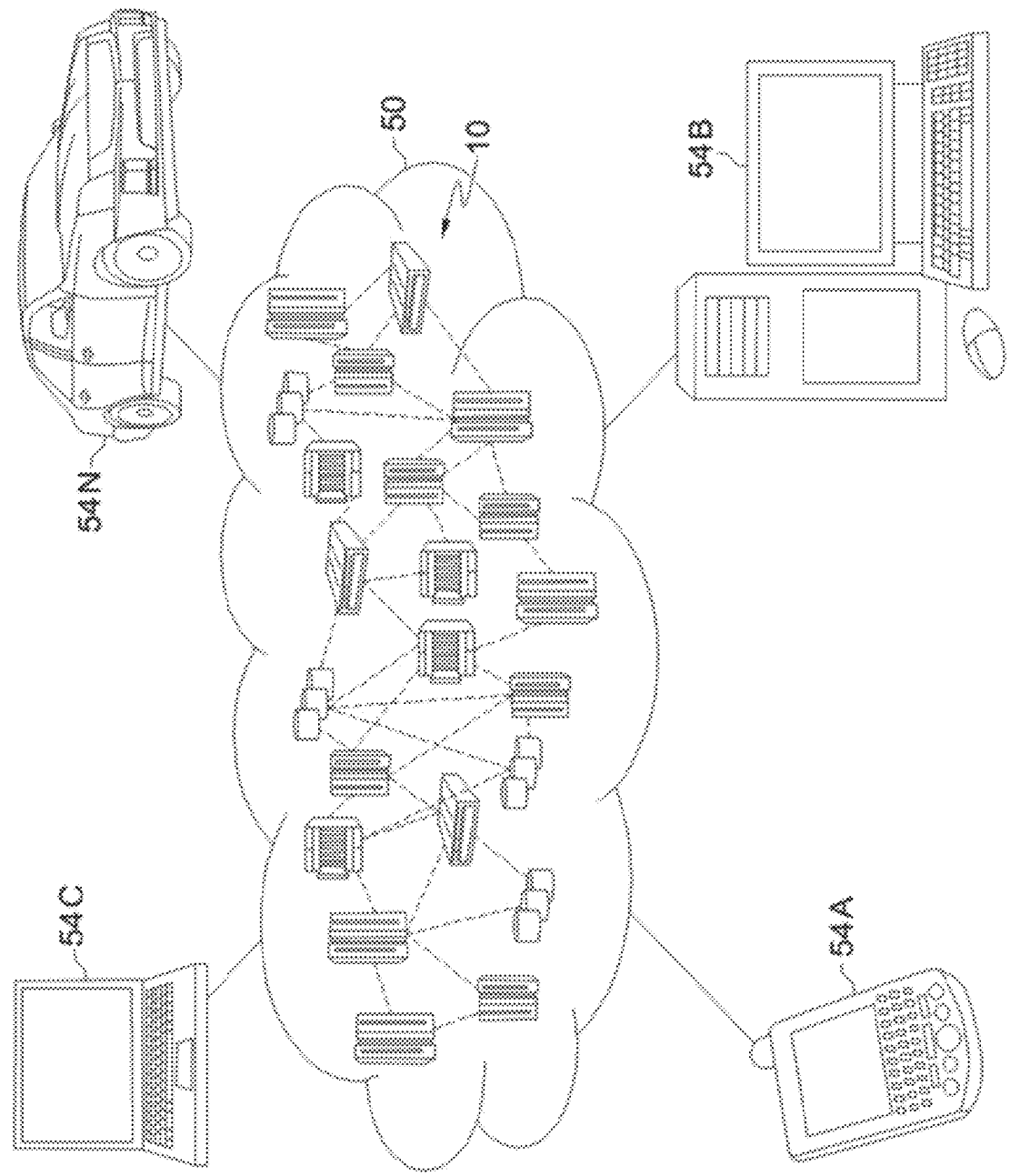
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
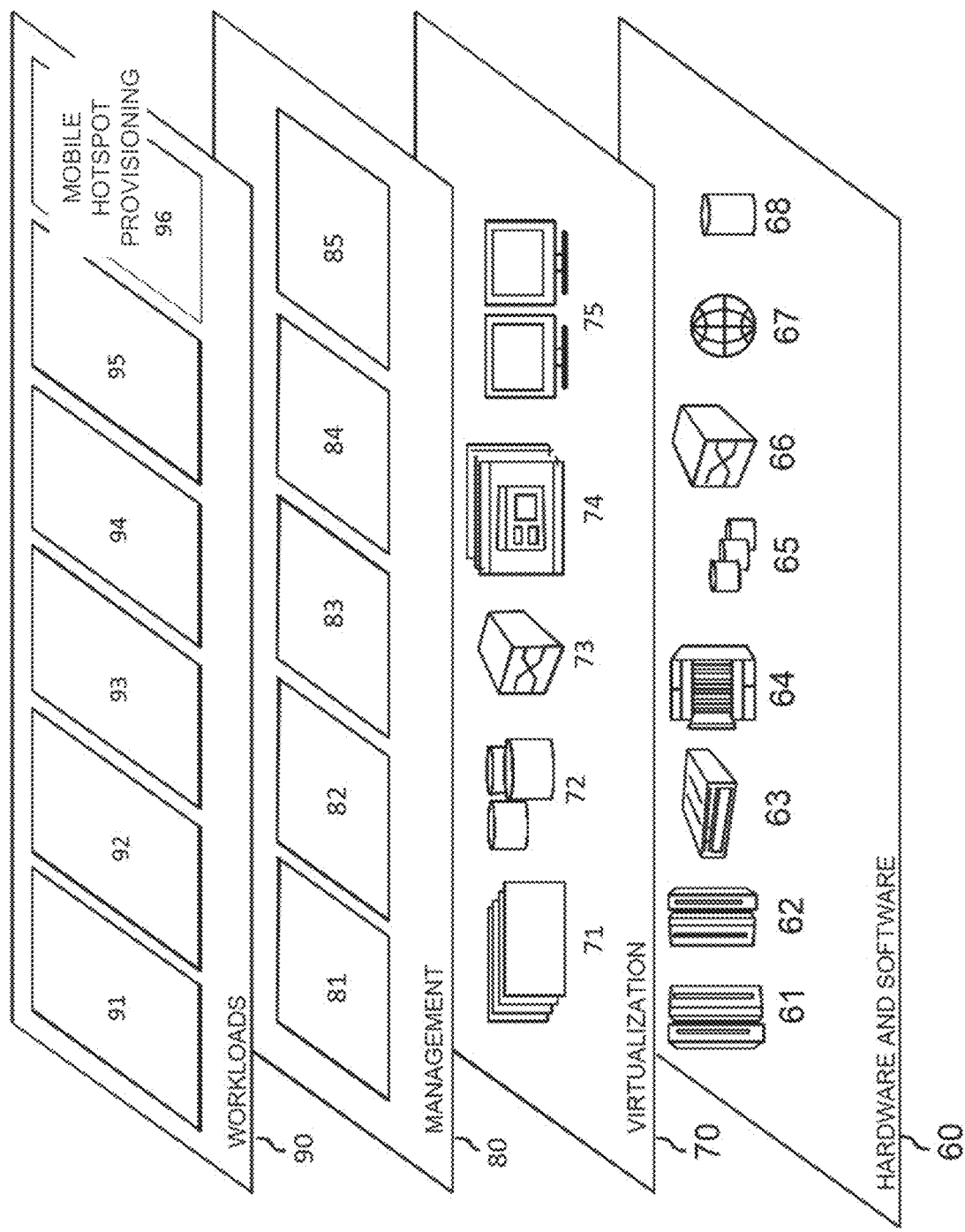
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile hotspot provisioning 96.

Implementations of the invention may include a computer system/server 12 of FIG. 1 in which one or more of the program modules 42 are configured to perform (or cause the computer system/server 12 to perform) one of more functions of the mobile hotspot provisioning 96 of FIG. 3. For example, the one or more of the program modules 42 may be configured to support a primary user providing Wi-Fi bandwidth to a secondary user by processing an incoming request for hotspot sharing including evaluating a trusted tier score for incoming request; creating allowance constraints based on timer, bandwidth, relationship graph and application usage; and accepting incoming requests with restrictions imposed by created allowance constraints.

Implementations of the invention may include a computer system/server 12 of FIG. 1 in which one or more of the program modules 42 are configured to perform (or cause the computer system/server 12 to perform) one of more functions of the mobile hotspot provisioning 96 of FIG. 3 to support a secondary user. For example, the one or more of the program modules 42 may be configured support a secondary user requesting Wi-Fi bandwidth by establishing a trusted connection to the primary user; requesting use of the primary user's broadband connection as a Wi-Fi hotspot; providing context information related to the request; and when authorized, connecting to a network such as the Internet using the primary user's bandwidth. In implementations, the computer system 12 is configured to act as a primary user and as a secondary user based on the user's needs.

Figure 4:
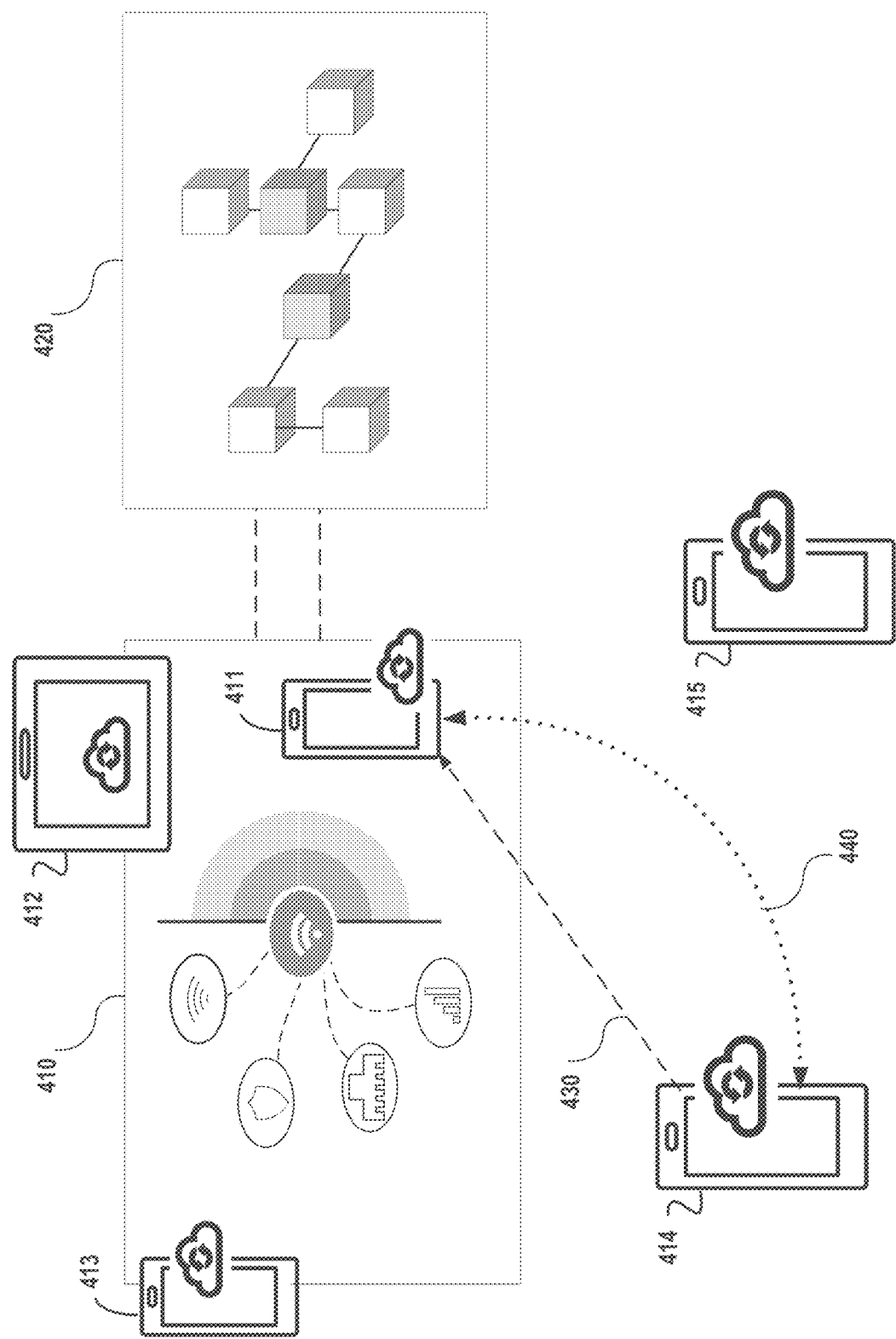
FIG. 4 shows a block diagram of an exemplary environment in accordance with aspects of the invention.

FIG. 4 shows a block diagram of an exemplary environment in accordance with aspects of embodiments. In embodiments, the environment includes a wireless communication network 410 accessible by multiple users, each operating a mobile device 411-415. Although only five mobile devices are shown for illustrative purposes, it will be understood that more or fewer mobile devices may be present in the network. Mobile devices 411-415 include, but are not limited to, mobile phones, electronic personal assistants, laptops/notebooks, tablets, and other mobile Internet devices. The wireless communication network 410 may be accessible by cellular broadband connections via unlimited or limited metered access for service subscribers, roaming access to non-subscribers, and generally for either a pre-paid monthly fee or fee for actual use. A mobile device needs to be configured with appropriate protocols for the communication service. For instance, cellular networks in the United States are typically either CDMA (Code Division Multiple Access) or GSM (Global System for Mobiles) networks. Differences between the two networks includes the frequency bands they run on and the way they transmit voice data across these bands. A mobile device can only directly connect to the type of network for which is it was originally designed. However, most mobile devices are Wi-Fi enabled for connection to the Internet using a wireless connection according to the IEEE 802.11 standard protocol. Embodiments as described herein enable a user (e.g., a secondary user), with a Wi-Fi connection but limited or no broadband connection, i.e., GSM or CDMA, to access the Internet via the broadband or other network connection of another user (e.g., a primary user). This is especially useful when the secondary user needs quick access to the Internet, but has no data minutes left, or is using a different protocol or service when traveling outside of their home area.

In an embodiment, a mobile device 411-415 may be configured to act as both a primary user (e.g., a lender or donor of broadband access), and a secondary user (e.g., a donee or borrower of broadband access). The mobile device 411-415 acts as either the primary or secondary user at any given time, but not both at the same time. A request 430 from a secondary user 414 to primary user 411, for example, for borrowed broadband, initiates a trusted connection 440 between the two devices. The primary user device 411 evaluates call context and assigns a criticality level to the secondary user device request 430. In an embodiment, the criticality level has three levels, such as C1, C2, and C3. Other embodiments may use more or fewer than three levels. In an embodiment, the secondary user device request for bandwidth includes a self-identified criticality level. The secondary user device 414 may iterate over various donor hotspots (i.e., user devices 411-413) to assess reachability and viability of multiple primary users' broadband access within the wireless communication network 410. A trusted tier score is assigned to each donor/donee pair. To evaluate the trust level of a borrower, the donor device reviews previous borrowing and lending history of the current borrower, for instance using blockchain ledgers for transaction history. The borrower may also evaluate the potential donor's history, when available.

In an embodiment, blockchain technology 420 is used to store historical ledgers corresponding to users' lending and borrowing transactions. Each user device 411-415 has a private key used to lock their transactions from manipulation in the blockchain. The historical ledgers remain visible to users of the hotspot provisioning system but cannot be altered without the private key.

The borrower device 414 computes an overall reachability score for the potential donor(s) 411-413 and sends a request 430 to the donor 411 with the highest reachability score. In an embodiment, the borrower device 414 may send requests to multiple potential donors to increase the odds that one donor will allow the broadband access loan, e.g., a wireless hotspot session. The request may include the trusted tier score as calculated by the borrower device.

When a donor receives a request to lend broadband access, the donor device evaluates the trusted tier score for the incoming request. The donor device creates allowance constraints based on timer, bandwidth, relationship graph and applications usage. The donor may accept the incoming request with restrictions imposed by created allowance constraints.

The borrower connects to the donor's hotspot 440 to commence their temporary use of the broadband connection within the allowance constraints. Constraints may include on-line time, data used, and the application connecting to the network. When the borrower concludes their use of the hotspot, the donor device and borrower device store their transaction ledgers to the blockchain 420. In an embodiment, a user's records are stored in one ledger that is updated each time a hotspot provisioning transaction is accepted and completed. In an embodiment, the ledger may include on-going hotspot provisioning transactions which are updated when the transaction is complete. Transaction ledgers are digitally signed by the user devices, but left open unencrypted, for access by other users assessing trust levels. In an embodiment, the ledgers for a single hotspot transaction are provided by both the donor and borrower and are ensured to match by the blockchain service.

Figure 5:
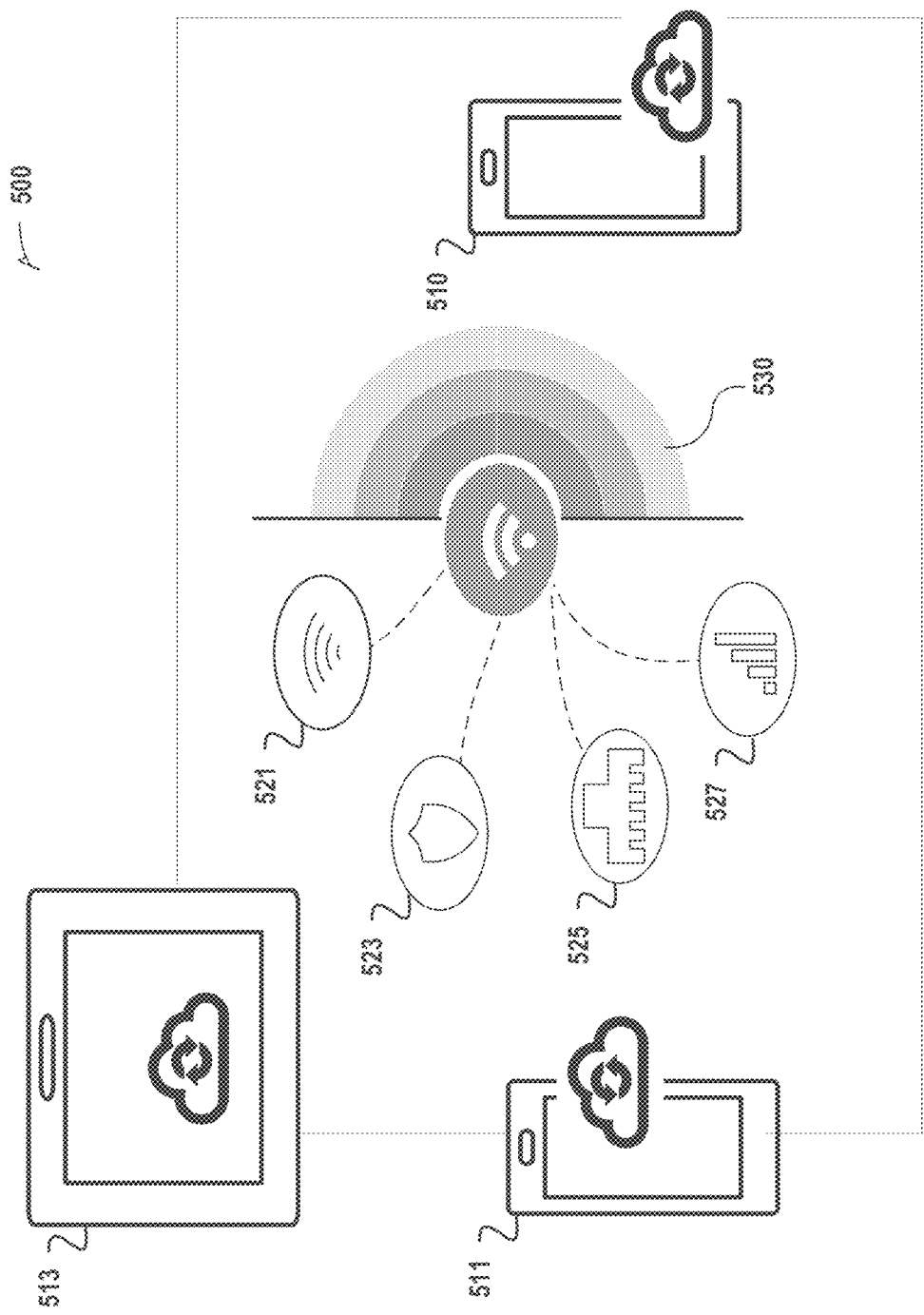
FIG. 5 shows a block diagram of an exemplary mobile hotspot provisioning environment, in accordance with aspects of the invention

FIG. 5 shows a block diagram of an exemplary mobile hotspot provisioning environment 500, in accordance with aspects of the invention. In an exemplary embodiment, primary user device 510 acts as a donor in a current transaction. Secondary user devices 511 and 513 act as borrower devices in the current transaction. Primary user device 510 is connected to a communication network via a broadband connection. Primary user device also has Wi-Fi 521 enabled with a level of security 523, and at a strength level 527. In an example, primary user device 510 is connected to the network via a VPN (virtual private network) so the security level 523 is high. As an alternative, primary user device may be connected to the network with a wired connection 525 and provide network access via the wired connection rather than broadband cellular. Secondary user devices 511 and 513 are within a proximity of primary user device 510 and may desire to borrow broadband access to connect to the communication network (i.e., the public Internet). Secondary user devices 511, 513 can communicate with the primary user device 510 using Wi-Fi, Bluetooth, near field communication (NFC) or any wireless technology that enables peer to peer connection, now known or available in the future.

Figure 6:
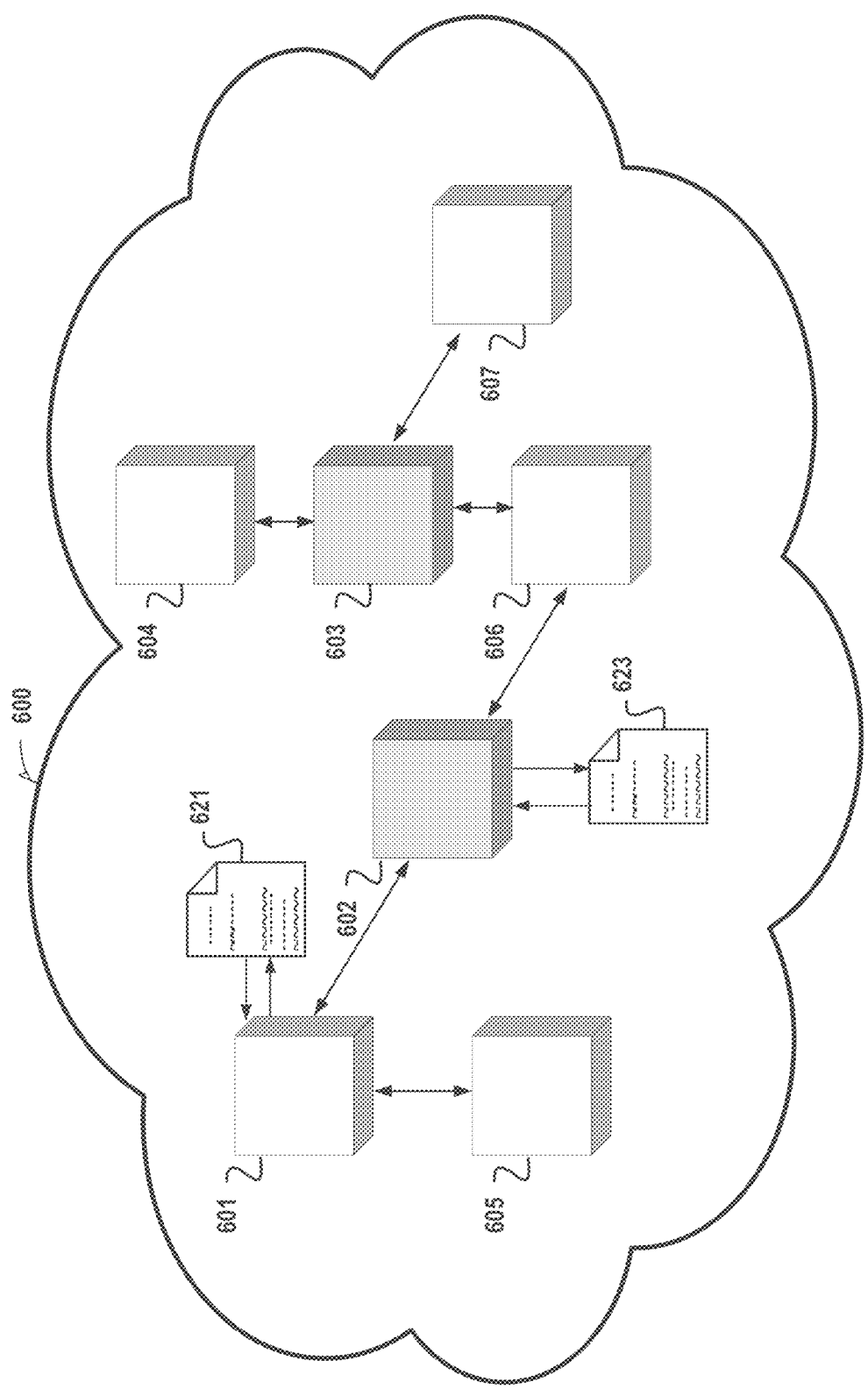
FIG. 6 shows a block diagram of an exemplary blockchain environment, in accordance with aspects of the invention.

FIG. 6 is a block diagram showing an exemplary blockchain environment, in accordance with aspects of the present invention. A blockchain can be defined as a distributed ledger taking the form of an electronic database that is replicated (i.e., distributed) on numerous compute nodes spread across an organization, a country, multiple countries, or the entire world. Records in a blockchain are stored sequentially in time in the form of blocks. Each block in the chain has a blockheader which contains various source data, a timestamp, etc. A hash is allocated to each blockheader which uniquely identifies the source data. The blockheader includes a reference to the hash of the previous block in the chain. When later blocks are added, each will have a reference to the block that precedes it in the chain. In other words, the blockchain is a type of distributed ledger. Ledgers may be stored locally on user devices that use them, as well as distributed within the blockchain environment. Ledgers periodically synchronize with corresponding ledgers on distributed devices. In an embodiment, the mobile devices using the hotspot provisioning system may be considered to be blockchain nodes. Therefore, a local copy of ledgers is stored on the local device and synchronized with the distributed nodes periodically when connected to the network. In an embodiment, local ledgers may be limited to transaction data for the mobile device itself and devices that have been in proximity with the mobile device or previously involved in a transaction with the mobile device in order to save storage space on the device.

In an embodiment, the blockchain is distributed in the cloud environment 600 which may be the same cloud environment 50 as in FIG. 2. Various nodes 601-607 may exist in the environment and communicate with one another to store/retrieve and synchronize blocks, or ledgers, in the chain. It will be understood that seven nodes 601-607 are shown for illustrative purpose, but that in implementation more or fewer nodes may be present in the cloud environment. This example shows ledgers 621 and 623 stored in nodes 601 and 602, respectively. It will be understood that theses ledgers 621 and 623 will be duplicated and synchronized with other nodes in the cloud 600, as necessary. In an embodiment, ledgers 621 and 623 comprise historical data corresponding to mobile hotspot provisioning transactions.

Figure 7A:
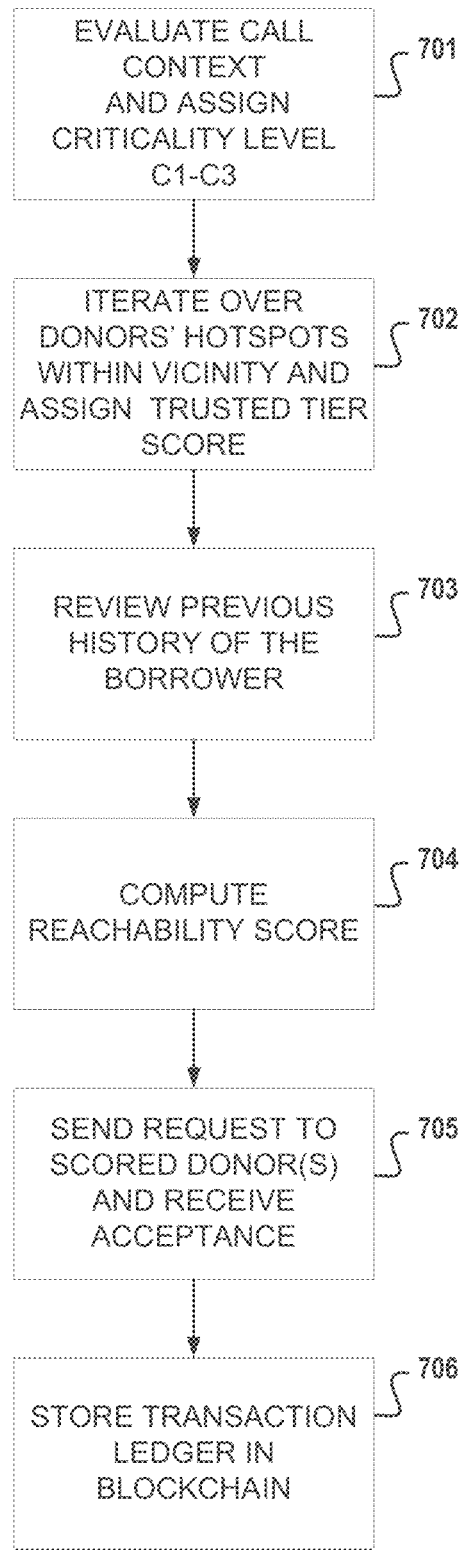
FIGS. 7A and 7B show flowcharts of an exemplary method for mobile hotspot provisioning, in accordance with aspects of the present invention.
Figure 7B:
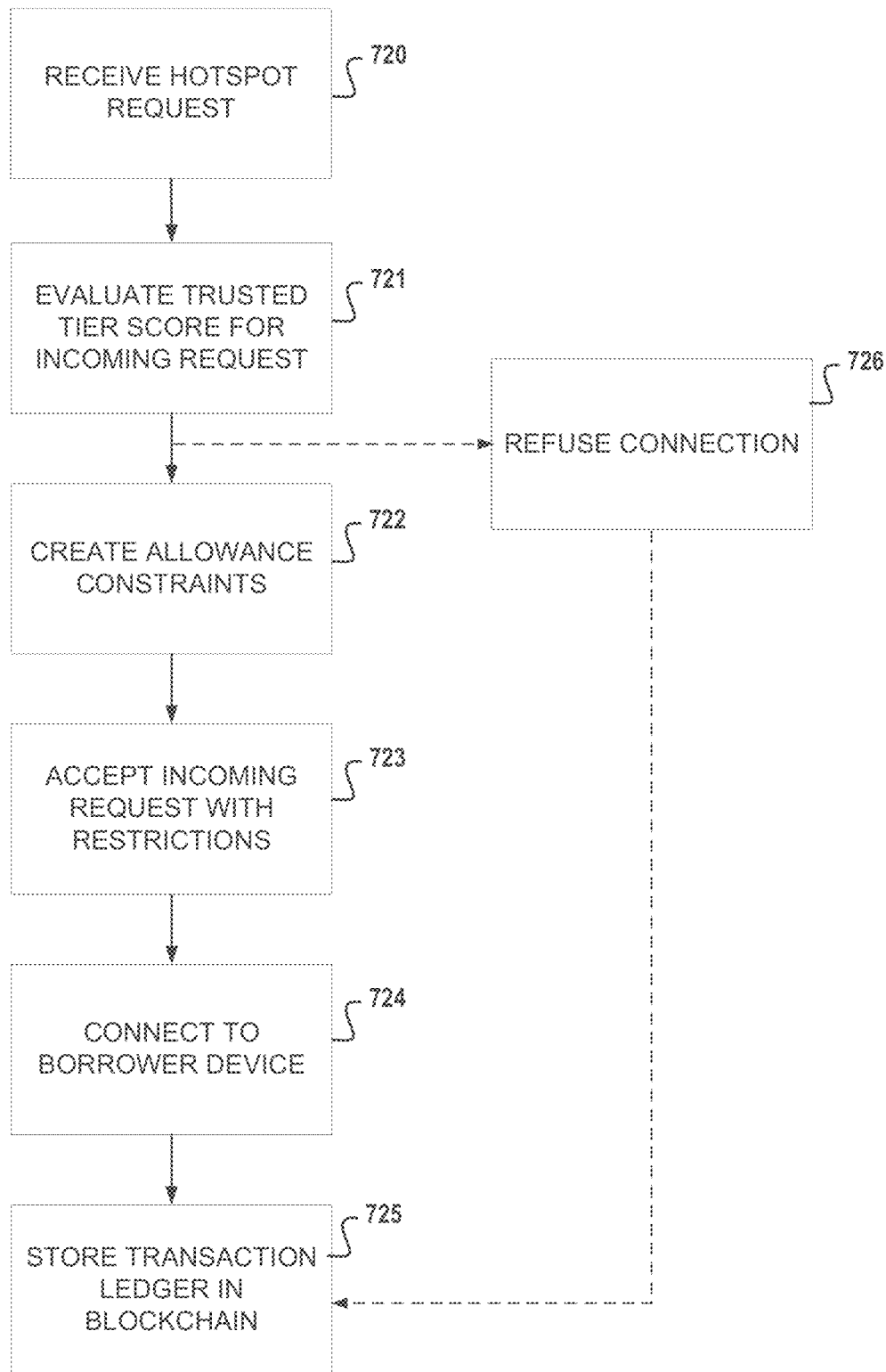

FIGS. 7A-7B show flowcharts of an exemplary method for mobile hotspot provisioning, in accordance with aspects of the present invention. Operations of the method may be carried out in the environment of FIGS. 4-6 and are described with reference to elements depicted in FIGS. 5 and 6. In implementations, a user may generate goodwill with other users by frequently acting as a donor. Incentives may be provided to donors to motivate them to lend bandwidth, as discussed more fully corresponding to FIG. 8. The donors' transactions are stored as ledgers in the blockchain to gain trust with other users. Frequent donors may be more likely to be accepted as borrowers based on their previous altruistic donor transactions. Therefore, it will be understood that a user's device will typically have provisioning functionality for both lending and borrowing broadband access. The lending and borrowing operations themselves may be separate program modules on the device or be integrated into one overarching program module. Program modules for lenders and borrowers may be implemented as program modules 42 of computer system/server 12, as shown in FIG. 1.

FIGS. 7A-7B are discussed herein with an example scenario for illustrative purposes. It will be understood that the lending and borrowing provisioning operations may differ in varying situations. In an example, John travels to the U.S. from India for training. John planned to purchase a mobile data plan at his destination, but circumstances prevented him from purchasing a local data plan. During weekend personal travel, when John does not have access to his office Wi-Fi, he desires to hire a shared ride to go sightseeing. At his hotel, he has Wi-Fi access and is able to book the automobile trip to the aquarium. However, John does not have access to Wi-Fi to book the return trip. Luckily, John will not be stranded because he subscribes to a mobile hotspot provisioning service, as described herein.

Referring to FIG. 7A, John initiates a search for a wireless donor on his mobile phone (secondary user device) with the borrower operation module. John enters the context of his need into the borrower operation module. i.e., need to schedule a shared ride to avoid being stranded. The secondary user device evaluates the call context in block 701 and assigns a criticality level. In this case, the criticality level may be assessed as a C3 (highly important) due to the risk of being stranded. Criticality level is calculated in the secondary user device, but it gets evaluated in the primary user device (donor device) as part of the decision process as to accept/reject the incoming request, as discussed below. In an example, the primary user device configures the acceptable deviations from the baseline criticality or priorities scores. The same applies to the trust tier score.

The secondary user device iterates over possible donor hotspots within the vicinity and assigns them a trusted tier score, in block 702. For purposes of illustration, the terms "in the vicinity" or "in proximity" are used to describe an area in which user devices can interact using a wireless network such as Wi-Fi, NFC, Bluetooth, or other wireless protocol. For instance, when a user device is "in proximity" to another user device, the two devices can see each other's presence and wireless signals. When in proximity, a user device's signal strength may vary, but is a non-zero strength. Possible donors in proximity to the secondary user device may broadcast information to be used in the evaluation of their trust tier. At this point, the secondary user device is not connected to the Internet and cannot access the full blockchain directly to determine trustworthiness. Some trust tier information may be stored locally as a circle of trust database, or as local ledgers. In an embodiment, a circle of trust is a list, database, or other data structure of users, each associated with a level of trust corresponding to the current user. The donors may broadcast some identifying information to enable the secondary user device to assign a trusted tier score to the donor device. In an example, a potential donor may be known to John as a friend, relative or colleague and automatically get a higher trust tier. Unknown donors will be assigned a trust tier based on a less trusting tier.

In embodiments, a service provider may offer to perform the processes described herein. In this case, the service provider can create, maintain, deploy, support, etc., the computer infrastructure that performs the process steps of the embodiments described herein for one or more customers. These customers may be, for example, any business that uses technology. In return, the service provider can receive payment from the customer(s) under a subscription and/or fee agreement and/or the service provider can receive payment from the sale of advertising content to one or more third parties. The secondary user device reviews history of John's borrowing and lending transactions which are stored as a local ledger, in block 703. The secondary user device computes a reachability score for the potential donors, in block 704. Reachability scores are based on at least, proximity to the donor; signal strength to the donor and if possible, the donor's signal strength to the broadband network; and trust tier of the donor. If there is more than one possible donor, the reachability scores may be ranked or prioritized. In an embodiment, the secondary user device sends a request for mobile hotspot provisioning to the highest ranked donor in block 705. In another embodiment, a request is sent to more than one highly ranked donor to increase the chance that one will accept. In this case, the secondary user device will connect to the first donor to respond with an acceptance. Once the secondary user receives an acceptance and connects to the mobile hotspot, the user may commence to use the requested application.

In this example, once connected to the donor's mobile hotspot, John can operate his ride sharing application and schedule a ride back to his hotel. However, constraints on the accepted connection may preclude John from connecting to the Internet with other applications or for other purposes. Also, once connected to the Internet, John's mobile device will send transaction information to the blockchain for the current transaction to update the ledger associated with him and his device. In an embodiment, transaction ledgers are associated strictly with a user. In another embodiment, each user may have separate ledgers for each of their mobile devices.

FIG. 7B shows the method of operation on the primary user's device (donor's device), in accordance with aspects of the present invention. When a user has unused bandwidth, they can opt-in to be a donor by activating the donor program module of the mobile hotspot provisioning application on their mobile device. In some embodiments, this activation may be automatic when the device has excess bandwidth, based on pre-determined criteria. The user may configure the automatic activation criteria. This operation may cause a periodic broadcast of certain elements of the donor's profile, including information for a secondary user to assess a trust tier for unknown donors. In an alternative embodiment, the primary user device may wait until a query or request is broadcast by the secondary user device before transmitting any donor information. When the primary user device (donor device) receives a request for bandwidth in block 720, the donor program module evaluates a trusted tier score for the secondary user and the request, in block 721. Because the primary user device has access to the Internet, blockchain ledgers associated with the secondary user can be retrieved and factored into the trusted tier score. The request for bandwidth will include enough user information to identify the appropriate blockchain ledger(s). The request also includes information regarding which applications need access to the Internet, a criticality level for the request, and optionally an estimate of data required. In an embodiment, the estimate of data needed is automatically calculated by the secondary user device, based on historical use of the application(s) being requested for usage. In another embodiment, the secondary user manually inputs an estimate of data needed to be sent with the request.

If the request is acceptable to the primary user device, i.e., it will not use more bandwidth than the donor user is willing to donate or take more time than the donor user is willing to provide, and the trust tier is at an acceptable level, the primary user device may choose to accept the request for a temporary hotspot. In an embodiment, the choice to accept a request is made automatically by the primary user device. In another embodiment, the primary user device requires user intervention to approve or reject a request. If the request is not acceptable, the primary user device rejects or refuses the connection in block 726 and then may record this refused transaction in as a blockchain ledger in block 725.

In an embodiment, the primary user device creates allowance constraints with restrictions for the wireless hotspot session, in block 722. It will be understood that acceptance of the secondary user request for hotspot bandwidth creates a single session. Future requests by the same user will initiate subsequent session. Subsequent sessions require another evaluation. In an embodiment, close friends and family may be authorized automatically for a second or subsequent session when the primary user device has sufficient available resources. For instance, if the primary user device has a plan with unlimited data and the secondary user requests 500 MB of data use, then the primary user has sufficient data available. The primary user may define allowable use parameters for data and bandwidth. In another example, the primary user may have a 500 Mbps broadband connection and be expected to need 300 Mbps connection based on the application(s) in use. If the secondary user device needs 350 Mbps bandwidth then the primary user device does not have sufficient bandwidth to loan out. The primary user may set default limits allowable to loan out, and each user having different levels of trust and urgency may be associated with different default thresholds, defining allowable resources. In an example, the primary user device has an unlimited data plan but sets a predetermined threshold (i.e., limit) on data usage for borrowers at 1 GB of data per session. If the secondary user device requests 2 GB data, then the primary user device will not have sufficient resources to fulfill the request.

Examples of resources that may have constraints includes, but is not limited to, limits on data usage, connection time, applications permitted to access the Internet, etc. Once the constraints and restrictions are set, the primary user device accepts the incoming request with the identified restrictions, in block 723. The secondary user device is then allowed connection to the primary user device via the mobile hotspot in block 724. The primary user device stores the on-going transaction ledger, and periodic updates corresponding to the transaction, in the local and network ledger blockchain in block 725. It should be noted that the primary user device can refuse to accept the connection if the borrower has a low level of trust, a low criticality or because the primary user determines another reason to decline.

Figure 8:
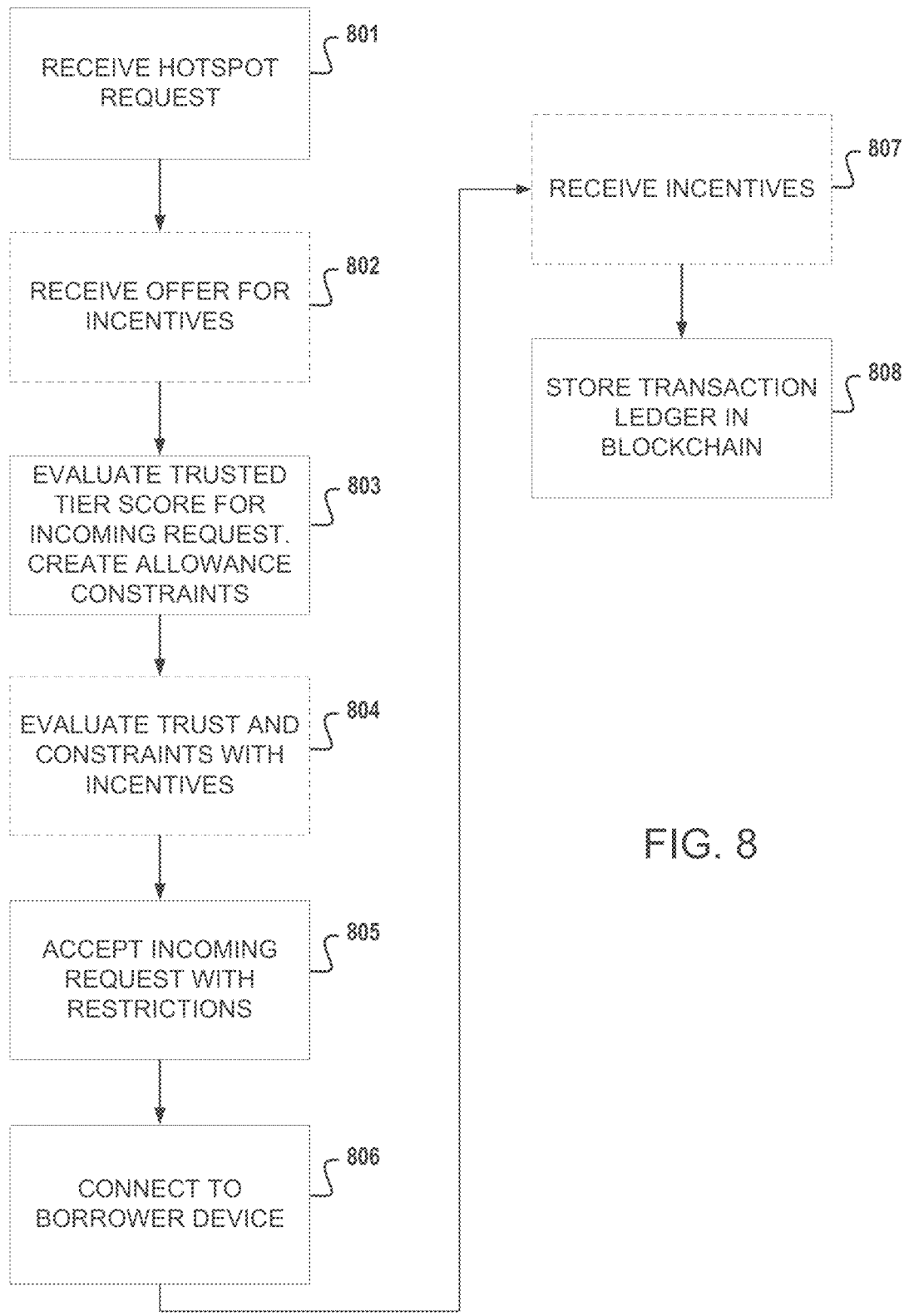
FIG. 8 shows a flow chart of an exemplary method for incentivizing hotspot donors, in accordance with aspects of the present invention.

FIG. 8 shows a flow chart of an exemplary method for incentivizing hotspot donors, in accordance with aspects of the present invention. In an embodiment, a potential donor receives a hotspot request in block 801. The potential donor receives offers for incentives as motivation for accepting hotspot requests, in block 802. Incentives may include, but are not limited to, free minutes as borrowers, cash or rebate offers from their mobile hotspot provisioning service provider based on data and time loaned out, additional Wi-Fi or broadband data or minutes, advertising-free minutes for services requiring the display of advertising to use the service or application, a bump up to a higher priority for a future borrowing request, etc. Incentives may be increased when loaning a mobile hotspot to users with a high urgency (e.g., criticality level). In other embodiments, incentives may be increased for requests of low urgency or unproven trust tiers to encourage donors to take more risk and allow non-urgent borrowing from strangers. This may promote more users to request bandwidth even if their usage is not critical, and promote new users with no proven trust levels to use the system. In an embodiment, the incentives may originate with the potential borrower. In an embodiment, the incentives originate from the mobile hotspot provisioning service.

The primary user device evaluates the trusted tier score for the incoming request and creates allowance constraints, in block 803. In some cases, the primary user device would accept the secondary user request regardless of incentives, and any incentive is just an added bonus to being a donor. However, in borderline cases, the incentive offer may help sway the decision to accept. The primary user device evaluates the trusted tier score for the incoming request and creates allowance constraints in block 804. In an embodiment, the primary user (donor) configures their device to accept borderline requests only when specific incentives are offered. In an example, Jane has only a limited amount of data in her pre-paid plan for the month, so she sets criteria for accepting requests that offer a 3-to-1 ratio of incentivized data to borrowed data. So, when an unknown user wants to borrow 1 MB of data, Jane will accept because she will receive 3 MB as incentive for a net gain of 2 MB. In embodiments, various criteria for incentives may be set for automatically accepting borrow requests. In another embodiment, a user must manually accept or reject the request based on a review of the inventive, trust level and urgency. In an embodiment, the primary user device may make a recommendation to the user whether to accept or reject the request, but the user manually selects to accept/ reject.

When the automatic or manual criteria is acceptable, the primary user device accepts the request with restrictions, in block 805. The primary user device and secondary user device are connected in block 806. Once the connection is made, the user may receive the incentives offered, in block 807. In an embodiment, incentives are automatically provided at commencement of the connection. In an embodiment, incentives are provided at the end of the connection. In an embodiment, the timing of receiving the incentives is based on the type of inventive offered. For instance, an offer of data bytes based on usage by the borrower cannot typically be provided until the connection is complete and the amount of data used is known. In another example, an offer of a flat 3 MB extra data for the donor's data plan can be provided as soon as the connection is made. The details of the mobile hotspot transaction are stored in the transaction ledger in block 808. In an embodiment, incentive transactions are stored in the ledger in the blockchain. In another embodiment, incentives may be kept as private transactions between a user and service provider.

In embodiments, the mobile hotspot provisioning system can allow for navigation of one's smart mobile device for wireless connection through hotspot donors in a crowded community for light-weight selective "essential applications." In order to avoid misuse of these types of resources and to enable a mutually beneficial outcome for all users, embodiments address concerns about security, sustainability, and trust. As discussed herein, embodiments provide a way for selective utilization of network bandwidth based on selection of applications in use and urgency in accordance with the rules configured by the user providing the service, thereby leading to application selective and contextual prioritization of network bandwidth in a seamless fashion. This also enables a higher level of control and security in the hands of the data provider.

Embodiments provide user specific restrictions on usage of certain applications based on sense of urgency, bandwidth requirement and criticality of the situation. The mobile hotspot provisioning system provides dynamic permission to certain applications deemed critical at that time with limited bandwidth cap in order to avoid misuse of the provider's (primary user) bandwidth/data network. This enables high security on the provider's end. In an embodiment, the primary user forms a network of certified people or devices that can be dynamically created with bandwidth/ application allocation caps, thereby ensuring the provisioning of essential network data only to known user/users in need, in a dynamic fashion. This concept can be thought of as a contextual prioritization of network bandwidth based on criticality of the situation by users known to the primary user. Enacting a known/authorized user list enables more control to the primary user. In an embodiment, authorized users may include friends and family, friends of friends and family, groups of colleagues or people with defined common interest or memberships in organizations (i.e., colleagues at the same company, university, or special interest group), etc. In an embodiment, a primary user can allow connections with known and authorized users regardless of criticality if the requested bandwidth is available. In an embodiment, unknown users may also be authorized when they have historical ledgers in the blockchain to indicate a high level of trust.

Figure 9:
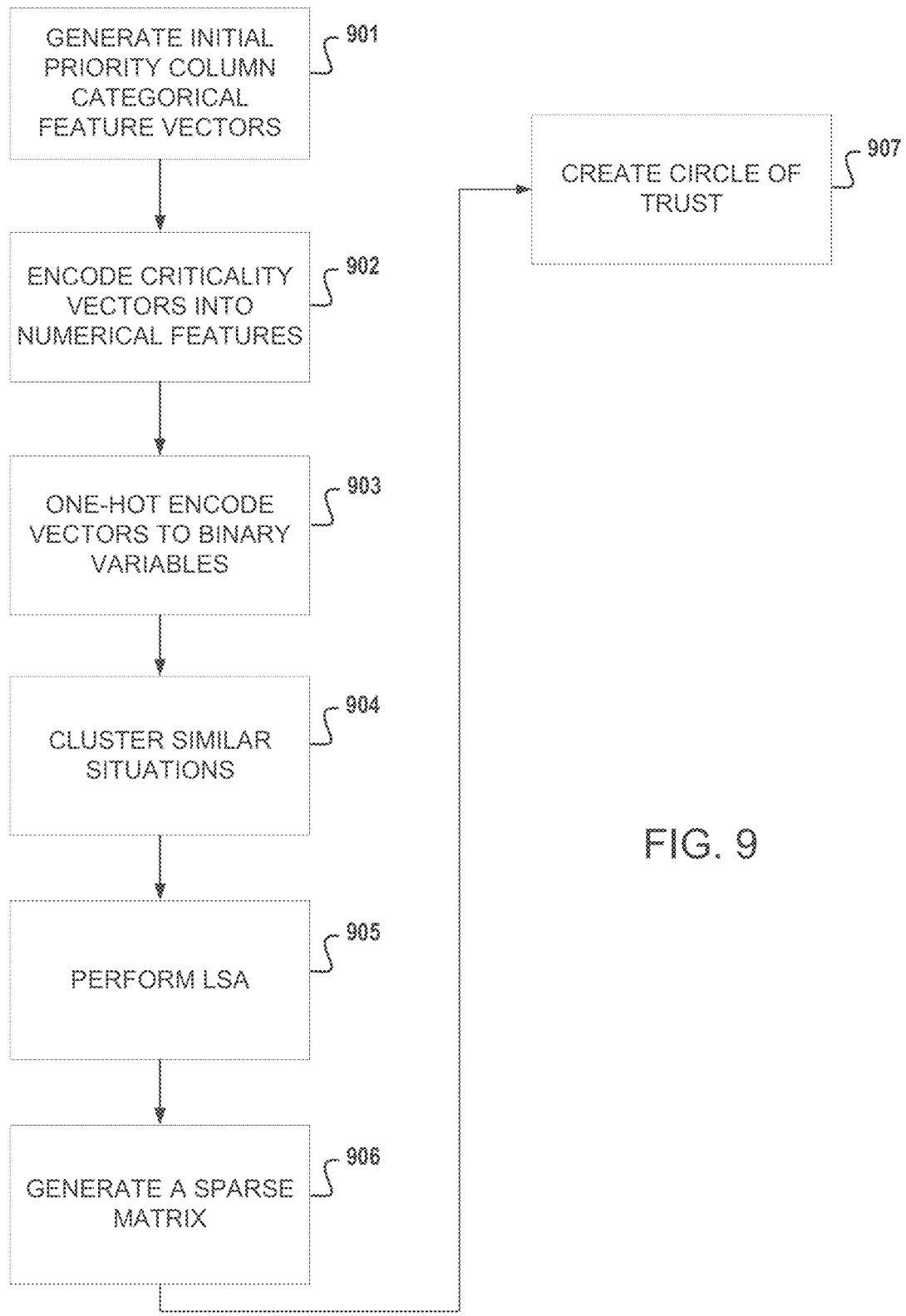
FIG. 9 shows a flow chart of an exemplary method for calculating the criticality level, in accordance with aspects of the present invention.

In embodiments, criticality of the request is derived in block 701 (of FIG. 7A) before the request is sent by the secondary user. FIG. 9 shows a flow chart of an exemplary method for calculating the criticality level, in accordance with aspects of the present invention. In an embodiment, the secondary user device calculates the criticality of the request based on a 3-level urgency. In an example, C1 is the lowest priority, C2 is medium priority and C3 is high priority. In embodiments, one or more machine learning algorithms or models are used to determine criticality levels and generate a circle of trust among users. In an embodiment, a dataframe model is created using the primary user identification (PU_ID) and secondary user identification (SU_ID), priority columns and trust column. In an exemplary implementation, the priority columns are initially set as categorical feature vectors as Low, Medium, or High, in block 901. They are encoded using a Label_Encoder function into numerical feature sets, in block 902, and a dummy variable is taken care of using a Python Data Analysis Library (e.g., pandas library). In this example, C1: 0, C2: 1, and C3: 2. They are one-hot encoded into binary variables, in block 903, such that if medium priority task needs to be done, priority column output can be merged using DataRefinery tool to showcase 010. In the context of the pandas library, One-hot Encoding is a type of vector representation in which all of the elements in a vector are 0, except for one, which has 1 as its value.

In an embodiment, an unsupervised machine learning algorithm such as K-means hierarchical clustering is used to measure distances between users. K-Means performs the division of objects into clusters that share similarities and are dissimilar to the objects belonging to another cluster. In this example, similar situations are clustered together based on the Euclidean distance of the labeled task with the unlabeled task newly arrived at the system, in block 904. The K-means or hierarchical clustering is used in order to measure the Euclidean distance of the centroid with the criticality of the situation as the centroid and categorizing the secondary user's need to be clustered in one of the criticality clusters. A least squares adjustment (LSA) uses a term-document matrix which describes the occurrences of terms in documents containing said set of tasks in textual format, in block 905. LSA is a general framework to determine unknown parameters based on given observations. A sparse matrix is created, in block 906, whose rows correspond to terms and whose columns correspond to documents. Cosine similarity between those terms extract the symbolic value showcasing if a particular task needs to be clustered as 010, 100 or 001 or in case dummy variable function is applied, can be categorized as 00, 01 or 10 since 00 would signify C3 priority task. A circle of trust is generated, i.e., a database, list, or other data structure of users, each associated with a level of trust, in block 907 and discussed below corresponding to FIG. 10.

Figure 10:
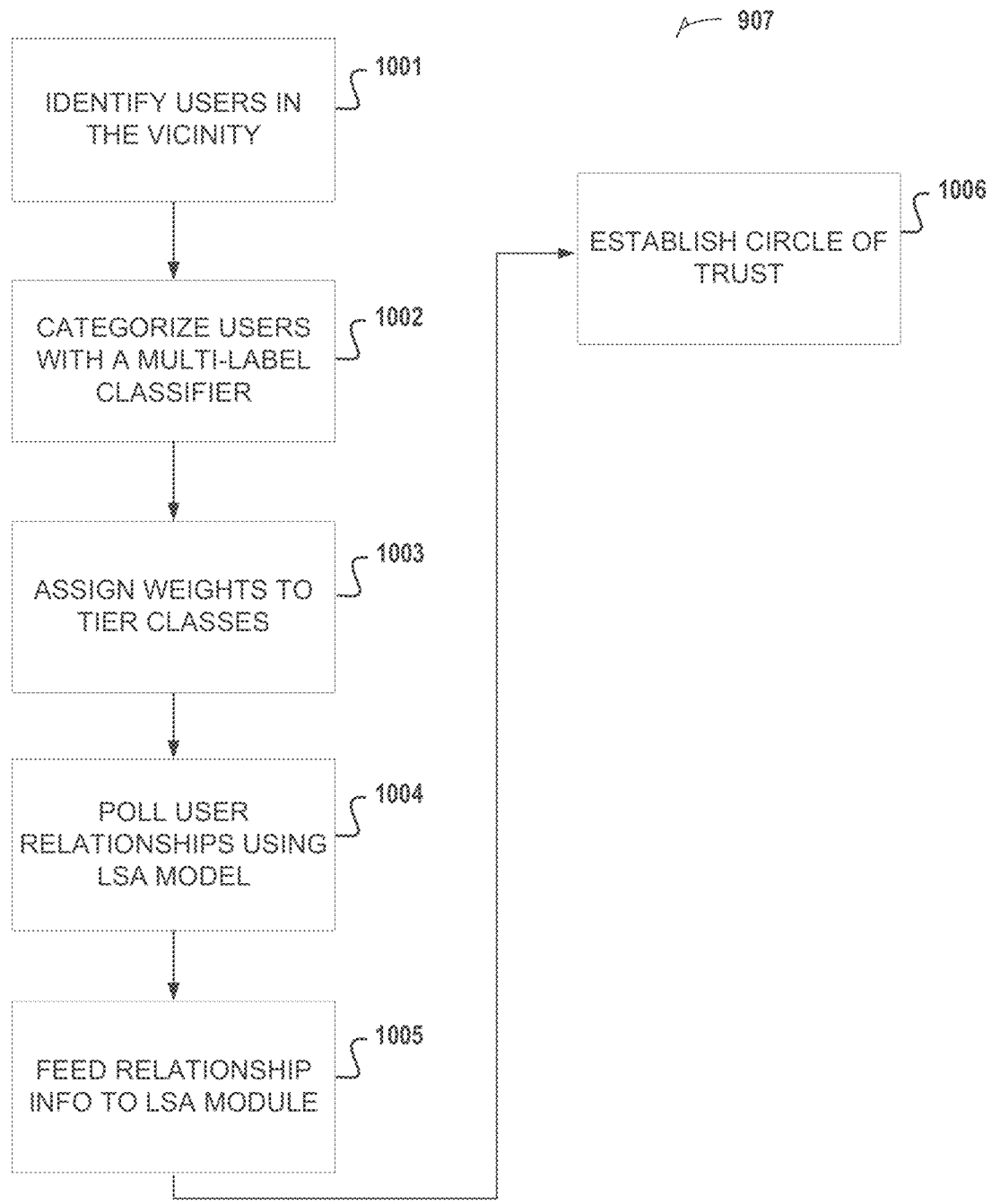
FIG. 10 shows a flow chart of an exemplary method for generating a circle of trust, in accordance with aspects of the present invention.

Referring now to FIG. 10, there is shown a flow chart of an exemplary method 907 for generating a circle of trust, in accordance with aspects of the present invention. A circle of trust is created using baseline random weights to users within the vicinity. A primary user device may generate a circle of trust for users in proximity. A secondary user device may update its circle of trust once it receives identifying information from primary user devices in the vicinity. In an embodiment, a secondary user device estimates a trust tier and updates the estimate after connecting to the Internet to retrieve current blockchain ledgers for users in proximity. In an embodiment, user identifications and trust tiers are stored locally on the user device so that secondary users have access to their circle of trust when off-line and cannot access the blockchain ledgers. In an embodiment, baseline models are uploaded in both the primary user device and secondary user device. The classification may be performed in both devices. The primary user device has flexibility to configure the inference and apply the classification in the decision process as whether to accept or reject the connection. For example, the primary user device may choose to always trust the requester, if the request comes from a user in the family. In another example, the primary user device may always run inference/classification by applying personalized settings or weights in order to classify the requests by the trust score.

Users in proximity to the user device are identified in block 1001. In an embodiment, users of the mobile hotspot provisioning system may periodically broadcast to other users in the vicinity to announce that they are close and available. In another embodiment, the secondary user device broadcasts a ping message to devices in the vicinity and waits for acknowledgement messages from available primary user devices. The user device uses a multi-label classifier to categorize the potential other user into one of a plurality of tiers, in block 1002. In an embodiment three tiers are used, labeled: T1, T2 or T3, wherein:

T1: Close Family and friends,
T2: Friends and colleagues, and
T3: People in low priority circle.

Close family and friends may be given automatic high priority to use network bandwidth and a higher level of application usage based on the proximity of the primary user device to the secondary user device. Friends and colleagues may be given a medium priority to use network bandwidth and relatively limited number of applications as configured by the primary user device. Unknown and other users may be assigned a T3 priority. T3 users might be strangers in need of network usage, thereby providing configuration control in the hands of the primary user device to save the pattern history of the people in the T3 tier. The primary user device may impose restrictions based on the T3 tier status of those users. The restrictions may depend on the T3 user's needs, criticality and additional attributes accompanying the T3 user's contextual situation.

In an embodiment, initial weights are assigned to the three tiers, in block 1003. In an example, a Keras library may be used to provide the weights. Keras is a free open source Python library for developing and evaluating deep learning models. Keras wraps the numerical computation libraries Theano and TensorFlow and allows a developer to define and train neural network models in just a few lines of code. Keras is used for creating deep models which can be productized on smartphones. In an embodiment, initial weights may be selected as random seeds and stored in the tier_class data construct. Keras may provide weights W1, W2, and W3 to the T1, T2, and T3 tier input parameters, respectively, using an exemplary function:

keras.initializers.Initializer( )
W1: 0.2
W2: 0.4
W3: 0.6

The user device polls the user's relationship, in block 1004, using a previously defined LSA model (904-905, FIG. 9) from scraping an online portal to access the contact and text information and feeds this to a text analytics model. In an example, the following may be used.

page=urllib2.urlopen(mediapage/contact_UI)
Using the Python BeautifulSoup Library,
soup=BeautifulSoup(page)
soup.<tag>.

This procedure returns content between the opening and the closing tag including the tag indicating frequency, information between tags. In an embodiment, this information is provided to a text analytics LSA module, in block 1005, to determine engagement level in scale weightage metric. Using information from the LSA module, a Keras library based artificial neural network (ANN) optimizer model performs back-propagation to re-allocate/retrain the weights W1, W2, W3. After n epochs, the training is complete and the weights associated with those tiers are classified via the ANN classifier into T1, T2 or T3 based on final values of the affinity weights.

Once the system has been trained, a circle of trust between entities in the vicinity is generated in block 1006. User devices in the vicinity are ranked or prioritized based on the determined level of trust between the user device and the primary user device. The circle of trust is based on tiers and criticality. It will be understood that calculated weights provide an overall importance score to the secondary users in need of certain applications at a particular point of time inculcated with secondary user's tiered relation with the primary user to dynamically allocate an upper threshold of data (e.g., {data_upper-Y}) amount of network bandwidth and {A,B,C} applications that might be required by the secondary user and provided by the primary user with highest weights. It will also be understood that the primary user device can generate a circle of trust based on current blockchain data of potential borrowers and known users. It will also be understood that as user devices enter or leave the vicinity, or their historical transaction data changes, the generated circle of trust generated by the primary user device may change.

In embodiments, the computer server/device 12 (FIG. 1) comprises mobile hotspot provisioning modules for both primary user and secondary user device functions, each of which may comprise one or more program modules such as program modules 42 described with respect to FIG. 1. The user devices may include additional or fewer modules than those shown as operational blocks in FIGS. 7A-B through FIG. 10. In embodiments, separate modules may be integrated into a single module. Additionally, or alternatively, a single module may be implemented as multiple modules. Moreover, the quantity of devices and/or networks in the environment is not limited to what is shown in FIGS. 4-6. In practice, the environment may include additional devices and/or networks; fewer devices and/or networks; different devices and/or networks; or differently arranged devices and/or networks than illustrated in FIGS. 4-6.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
receiving, by a first user device operated by a first user, a request for a wireless hotspot session by a second user device operated by a second user, the request including a level of urgency and bandwidth requirement of the second user device;
determining, by the first user device, whether to authorize the requested wireless hotspot session based in part on the level of urgency and the bandwidth requirement of the second user device;
responsive to authorization by the first user device, the first user device connecting the second user device to the first user device's wireless hotspot for the wireless hotspot session, and restricting use of the second user device in the wireless hotspot session based on the bandwidth requirement of the second user device and context of use of the second user device;
responsive to rejection by the first user device, the first user device refusing a connection to the second user device by the first user device for the wireless hotspot session; and
providing, by the first user device, transaction information corresponding to the wireless hotspot session as a blockchain ledger.

2. The computer implemented method as recited in claim 1, further comprising:
creating, by the first user device, a list of trusted network devices of the first user device, wherein a network device in the list of trusted network devices includes a multi-label classifier which categorizes the network device into one of a plurality of trust tiers representing a relationship between the network device and the first user device, wherein each trust tier is associated with a priority, wherein the restricting use of the second user device is based in part on a trust tier level associated with the second user device in the list of trusted network devices.

3. The computer implemented method as recited in claim 1, further comprising:
receiving, by the first user device, the request for a wireless hotspot session from the second user device, wherein the request for wireless hotspot session includes a device identifier, the level of urgency, the context of use of the second user device, and an estimate of the bandwidth requirement;
evaluating, by the first user device, a trust score for the request for a wireless hotspot session;
creating allowance constraints based in part on the trust score, the estimate of the bandwidth requirement, and the level of urgency; and
accepting the request for a wireless hotspot session restricted by the allowance constraints.

4. The computer implemented method as recited in claim 3, further comprising:
assigning a priority to the request for a wireless hotspot session based on the level of urgency; and
accepting requests for a wireless hotspot session from a higher priority request before accepting requests for a wireless hotspot session for a lower priority request.

5. The computer implemented method as recited in claim 4, further comprising:
creating a list of trusted network devices of the first user device, wherein a network device in the list of trusted network devices includes a multi-label classifier which categorizes the network device into one of a plurality of trust tiers representing a relationship between the network device and the first user device, wherein each trust tier is associated with a priority;
assigning a higher priority to the request for a wireless hotspot session based on the trust tier of the second user device; and
automatically accepting the request for a wireless hotspot session when the priority of the request exceeds a predetermined threshold, and when the primary user device has sufficient resources to provide the requested wireless hotspot session.

6. The computer implemented method as recited in claim 1, further comprising:
retrieving a transaction ledger having historic hotspot transactions information, the transaction ledger corresponding to the second user device;
evaluating the historic hotspot transactions of the second user device; and
determining a trust level of the second user device based in part on the historic hotspot transactions, wherein restricting the use of the second user device is based in part on the trust level of the second user device.

7. The computer implemented method as recited in claim 6, further comprising:
receiving, by the first user device, an offer of an incentive corresponding to the request for a wireless hotspot session; and
accepting, by the first user device, the request for a wireless hotspot session contingent upon receiving the offered incentive.

8. The computer implemented method as recited in claim 6, wherein the connecting of the second user device to the first user device's wireless hotspot for the wireless hotspot session is performed automatically when the trust level exceeds a predetermined threshold, and the first user device has sufficient resources to provide the requested wireless hotspot session.

9. The computer implemented method as recited in claim 6, further comprising:
providing to the first user a connection recommendation for the wireless hotspot session corresponding to the request for a wireless hotspot session including the trust level, bandwidth requested, and the context of use; and
receiving a connection recommendation override from the first user instructing the first user device to reject the request for a wireless hotspot session.

10. A computer program product comprising one or more computer readable storage media having program instructions collectively stored on the one or more computer readable storage media, the program instructions executable to:
identify a criticality level for bandwidth required by a second user of a second user device;
identify, by the second user device, at least one device having hotspot bandwidth in proximity to the second use device;

assign a trust score to each of the at least one device based on a known transaction history of each of the at least one device or transaction history broadcast by the at least one device;
compute a reachability score for each of the at least one device;
select a first user device from the at least one user device based in part by the trust score and reachability score corresponding to the first device;
send a request for a wireless hotspot session to the first user device, the request including the identification of the second user device and the identified criticality level for bandwidth required by the second user device; and
responsive to the first user device accepting the wireless hotspot session and connecting to the second user device, provide a transaction blockchain ledger for the wireless hotspot session.

11. The computer program product, as recited in claim 10, further comprising program instructions executable to:
access a transaction blockchain ledger corresponding to the first user device; and
update a local trust database with information corresponding to the first user device.

12. The computer program product, as recited in claim 10, further comprising program instructions executable to:
select a third user device from the at least one user device based in part by the trust score and reachability score corresponding to the third device;
send a second request for a wireless hotspot session to the third user device, the second request including the identification of the second user device and the identified criticality level for bandwidth required by the second user device; and
responsive to an earlier wireless hotspot session acceptance by one of the first user device and third user device and connecting with the wireless hotspot session to whichever device has sent the earlier wireless hotspot session acceptance, provide the transaction blockchain ledger for the earlier wireless hotspot session.

13. The computer program product, as recited in claim 10, wherein the reachability score is based in part on proximity to the second user device, signal strength to the second user device, and trust score of the second user device.

14. A system comprising:
a processor, a computer readable memory, one or more computer readable storage media, and program instructions collectively stored on the one or more computer readable storage media, the program instructions executable to:
receive, by a first user device operated by a first user, a request for a wireless hotspot session by a second user device operated by a second user, the request including a level of urgency and bandwidth requirement of the second user device;
determine, by the first user device whether to authorize the requested wireless hotspot session based in part on the level of urgency and the bandwidth requirement of the second user device;
responsive to authorization by the first user device, program instructions to connect the second user device to the first user device's wireless hotspot for the wireless hotspot session, and restrict use of the second user device in the wireless hotspot session based on the bandwidth requirement of the second user device and context of use of the second user device;
responsive to rejection by the first user device, program instructions to refuse a connection of the second user device to the first user device for the wireless hotspot session; and
provide, by the first user device, transaction information corresponding to the wireless hotspot session as a blockchain ledger.

15. The system as recited in claim 14, further comprising program instructions executable to:
create a list of trusted network devices of the first user device, wherein a network device in the list of trusted network devices includes a multi-label classifier which categorizes the network device into one of a plurality of trust tiers representing a relationship between the network device and the first user device, wherein each trust tier is associated with a priority, and wherein the restricting use of the second user device is based in part on a trust tier level associated with the second user device in the list of trusted network devices.

16. The system as recited in claim 15, further comprising program instructions executable to:
identify a plurality of user devices in proximity to the first user device;
categorize the plurality of user devices each with a multi-label classifier into one of a plurality of trust tiers;
assign initial weights to each trust tier;
provide a trained artificial neural network model with identified relationships between the first user device and each of the plurality of user devices for retraining of the trained artificial neural network model;
generate circle of trust data for each of the plurality of user devices based on trust tiers, criticality, and weights from the trained artificial neural network model;
associate an importance score to each of the plurality of user devices based on the circle of trust data; and
send an acceptance to connect to a wireless hotspot session of the first user device to at least one of the plurality of user devices based on the importance score of each of the plurality of user devices, and available resources of the first user device.

17. The system as recited in claim 14, further comprising program instructions executable to:
receive by the first user device, a request for a wireless hotspot session from the second user device, wherein the request for wireless hotspot session includes a device identifier, a level of urgency, the context of use of the second user device, and an estimate of bandwidth required;
evaluate by the first user device a trust score for the request for a wireless hotspot session;
create allowance constraints based in part on the trust score, bandwidth required, and the level of urgency; and
accept the request for a wireless hotspot session restricted by the allowance constraints.

18. The system as recited in claim 17, further comprising program instructions executable to:
assign a priority to the request for a wireless hotspot session based on the level of urgency; and
accept requests for a wireless hotspot session from a higher priority request before accepting requests for a wireless hotspot session for a lower priority request.

19. The system as recited in claim 17, further comprising program instructions executable to:
create a list of trusted network devices of the first user device, wherein a network device in the list of trusted network devices includes a multi-label classifier which categorizes the network device into one of a plurality of trust tiers representing a relationship between the network device and the first user device, wherein each trust tier is associated with a priority;

assign a higher priority to the request for a wireless hotspot session based on the trust tier of the second user device; and automatically accept the request for a wireless hotspot session when the priority of the request exceeds a predetermined threshold, and when the primary user device has sufficient resources to provide the requested wireless hotspot session.

20. The system as recited in claim 14, further comprising program instructions executable to:

retrieve a transaction ledger having historic hotspot transactions information, by the first user device, the transaction ledger corresponding to the second user device;

evaluate by the first user device, the historic hotspot transactions of the second user device;

determine by the first user device, a trust level of the second user device based in part on the historic hotspot transactions;

receive by the first user device, an offer of an incentive corresponding to the request for a wireless hotspot session; and accept by the first user device the request for a wireless hotspot session contingent upon receiving the offered incentive, wherein the restricting use of the second user device in the wireless hotspot session is further based on the trust level.

* * * * *